United States Patent [19]
Girling et al.

[11] Patent Number: 6,092,067
[45] Date of Patent: *Jul. 18, 2000

[54] DESKTOP INFORMATION MANAGER FOR RECORDING AND VIEWING IMPORTANT EVENTS DATA STRUCTURE

[75] Inventors: Robert Marcus Girling, Seattle; Jennifer Ruth Mead, Bellevue; Nicholas Paul Duane, Bothell; Se-Wai Lee, Bellevue; David John Brennan, Kirkland; Eric Van Doren, Seattle; Michael Gene Leu, Kirkland, all of Wash.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/657,645

[22] Filed: May 30, 1996

[51] Int. Cl.$^7$ .................................................. G06F 17/30
[52] U.S. Cl. .......................... 707/100; 707/204; 345/326
[58] Field of Search ................................... 707/100, 204, 707/7; 345/326

[56] References Cited

U.S. PATENT DOCUMENTS

| | | | |
|---|---|---|---|
| 5,649,182 | 7/1997 | Reitz ............................................ | 707/7 |
| 5,845,257 | 12/1998 | Fu et al. ...................................... | 705/8 |
| 5,873,108 | 2/1999 | Goyal et al. ............................. | 707/507 |
| 5,917,489 | 6/1999 | Thurlow .................................... | 345/34 |

OTHER PUBLICATIONS

Freeman et al., "Lifestreams: Organizing Your Electronic Life"< Proceedings of the AAAI Fall Symposium on Al Applications in Knowledge Navigation, MIT, Nov., 1995, Reprinted From http://www.halcyon.com/topper/jv6n.htm, p. 1–17.

Gelernter, D., "The Cyber–Road Not Taken: Lost on the Info–Highway? Here's Some Stuff That Could Really Change Your Life," *The Washington Post*, Apr. 3, 1994, Sunday, Final Edition, pp. 1–9 (printed from http://www-.mirrorworlds.com/horizons/0.html).

"Intelligent Information–Sharing Systems," Malone et al., Computing Practices, vol. 30, No. 5, May 1987.

"Knowledge Based Documents Classification Supporting Integrated Document Handling," Eirund et al, ACM Conference on Office Information Systems, 1988.

"A Rule–Based Message Filtering System," Pollock, ACM Transactions on Office Information Systems, vol. 6, No. 3, Jul. 1988.

"Cooperative Work in the Andrew Message System," Borenstein et al., ACM Proc. Conference on Computer Supported Coorperative Work, 1988.

"Semi–Structured Messages are Surprisingly Useful for Computer–Supported Coordination," Malone et al., ACM Proc. Conference on Computer Supported Cooperative Work, 1988.

"Office–by–Example: An Integrated Office System and Database Manager," Whang et al., IBM Thomas J. Watson Research Center, ACM Transactions on Office Information Systems vol. 5, No. 4, pp. 393–427, Oct. 1987.

(List continued on next page.)

*Primary Examiner*—Paul R. Lintz
*Attorney, Agent, or Firm*—Jones & Askew, LLP

[57] ABSTRACT

A system for selectively recording a data structure where one or more external program modules are registered. A group of important actions is selected corresponding to both internal program modules and registered external program modules. The system determines if an action associated with one of the internal program modules or one of the registered external program modules has occurred. If so, the system determines if the action is one of the important actions. If the action is an important action, then information associated with the important action is placed into data fields of a data structure. The data structure containing the information is stored in computer memory. The data structure is maintained within a central container or folder in memory, along with previously recorded data structures. The data structure can be automatically deleted after a predetermined threshold of time. A representation of the data structure can be viewed along with representations of previously recorded data structures along a chronological timeline in related groups. The groups are based upon a particular data field of the data structure.

32 Claims, 10 Drawing Sheets

OTHER PUBLICATIONS

Chapter 15 "Event Viewer" in the Microsoft Windows NT Systems Guide Manual, pp. 401–414.

Chapter 17 "Performance Monitor" in the Microsoft Windows NT Systems Guide Manual, pp. 435–470.

Kimberly Maxwell, "Who–What–When Enterprise Monitors Group Happenings", PC Magazine, vol. 10, No. 6, Mar. 26, 1991, p. 49.

Steve Guilliland, "Info Select 1.0", Windows Sources, vol. 1, No. 5, Jun. 1993, p. 264–265.

Preston Gralla, "Shareware To KeepYou and Your Information Organized", Computer Shopper, vol. 15, No. 11, Nov. 1995, p. 630–632.

Kreithen et al., "Theoretical Analysis of a Ranking Discrimination Algorithm", Asilomar Conference on Signals, Systems, and Computers (26th), Oct. 1992, p. 431–435.

FIG. 4

Need a new account for-Tony Journal Entry — 405

File  Edit  Insert  Format  Tools  View  Journal  Help

Save and Close

| General | Other |

● Journaled on Wednesday, October 18, 1995 5:18 PM.

Subject: Need a new account for Tony — 410a

Type: mail message — 410c

Contact: Administrator — 410d

Company: — 410b (410e)

When: Sun 2/17/97    6:23 PM ▽ — 410f    For: 0 hours ▽ — 410g    Start ▽

Notes:
Need a new account for Tony — 415, 410h

Categories — 410i    Private ☐

6,092,067

DESKTOP INFORMATION MANAGER FOR RECORDING AND VIEWING IMPORTANT EVENTS DATA STRUCTURE

TECHNICAL FIELD

This invention generally relates to selectively recording a data structure associated with an action by a program module and viewing a representation of the data structure and, more particularly described, relates to selectively viewing a data structure associated with an important action by a program module and viewing a representation of the data structure along a timeline in relation to representations of previously recorded data structures.

BACKGROUND OF THE INVENTION

As communications and computer technology advances, most people would agree that the information age has arrived. Some may bask in the ability to access, track, and view vast amounts of information quickly. Yet, others may feel lost in such a sea of information.

In the course of a computing day, a computer user can easily become deluged and swamped with information. The computer user performs many actions associated with important information such as sending electronic mail, creating new documents, updating documents, making appointments, and making and taking telephone calls. Traditionally, the user has had to manually write details regarding such important information into a bound journal or a separate electronic document.

In an effort to organize all of this information, personal information manager programs have attempted to provide an electronic tool for scheduling, electronic mail management, task management ("to-do" lists), and contact management. Information has become better organized with personal information manager programs, but deciphering what information to deal with, tracking and analyzing information associated with actions from inside as well as from outside the program, and determining how to use such information can still be problematic.

People using information management tools want to keep track of only actions that are important and view those important actions in a way that is useful. However, existing information management tools apparently lack a provision to allow user selectivity of which actions are important enough to be tracked. Furthermore, there is apparently no capability for recording information related to important actions associated with either a program module internal to the information management tool or a program module external to the information management tool.

Therefore, there is a need for a system for selectively recording a data structure associated only with important actions. There is also a need to record a data structure associated with an action by either an internal program module or an external program module. Furthermore, there is a need for viewing a representation of a data structure in combination with representations of other previously recorded data structures whereby the data structure can be viewed on the display provided by the user interface in relation to when the other previously recorded data structures were recorded in memory.

SUMMARY OF THE PRESENT INVENTION

The present invention satisfies the above-described needs by providing a system for selectively recording a data structure associated with an action by one of a predetermined group of program modules. In general, the system determines if an action associated with one of the predetermined program modules has occurred. If so, then the system selectively records a data structure in memory if the action is an important action. The data structure contains information about the action.

More particularly described, the system determines if an action associated with one of the predetermined program modules has occurred. The predetermined group of program modules typically comprise both internal program modules and external program modules. An internal program module is one of a group of integrated program modules within a single program module. An external program module is not one of a group of integrated program modules within the single program module. The system filters the action to determine if the action is an important action. If so, the system records a data structure in memory by separating information associated with the important action into data fields of the data structure.

Additionally, a representation of the data structure can be viewed along with representations of other previously recorded data structures in a specified viewing manner, such as in chronological order. The representation of the data structure may be presented to the user in the form of a graphical object, such as an icon, or information associated with the data structure. The representation of the data structure and the representations of the previously recorded data structures can be selectively grouped together when chronologically viewed. The grouping is typically based upon a particular data field of the data structure. The system can delete the data structure from memory after a predetermined threshold of time to avoid maintaining too many data structures in memory and wasting memory resources.

It is therefore an object of the present invention to selectively record and view a data structure associated with an action by a program module.

It is a further object of the present invention to provide a computer-implemented process of selectively recording a data structure associated only with important actions.

It is a further object of the present invention to provide a computer-implemented process of recording a data structure associated with an action by either an internal program module or an external program module.

It is a further object of the present invention to provide a view of a representation of a data structure and representations of other previously recorded data structures whereby the data structure can be viewed on the display provided by the user interface in relation to when the other previously recorded data structures were recorded in memory.

These and other advantages of the present invention will be appreciated from studying the following detailed description and drawings, and the appended claims.

BRIEF DESCRIPTION OF THE DRAWINGS

FIG. 4 is a screen display showing data fields for a data structure in accordance with the preferred embodiment of the present invention.

DETAILED DESCRIPTION OF THE PREFERRED EMBODIMENT

Figure 1:
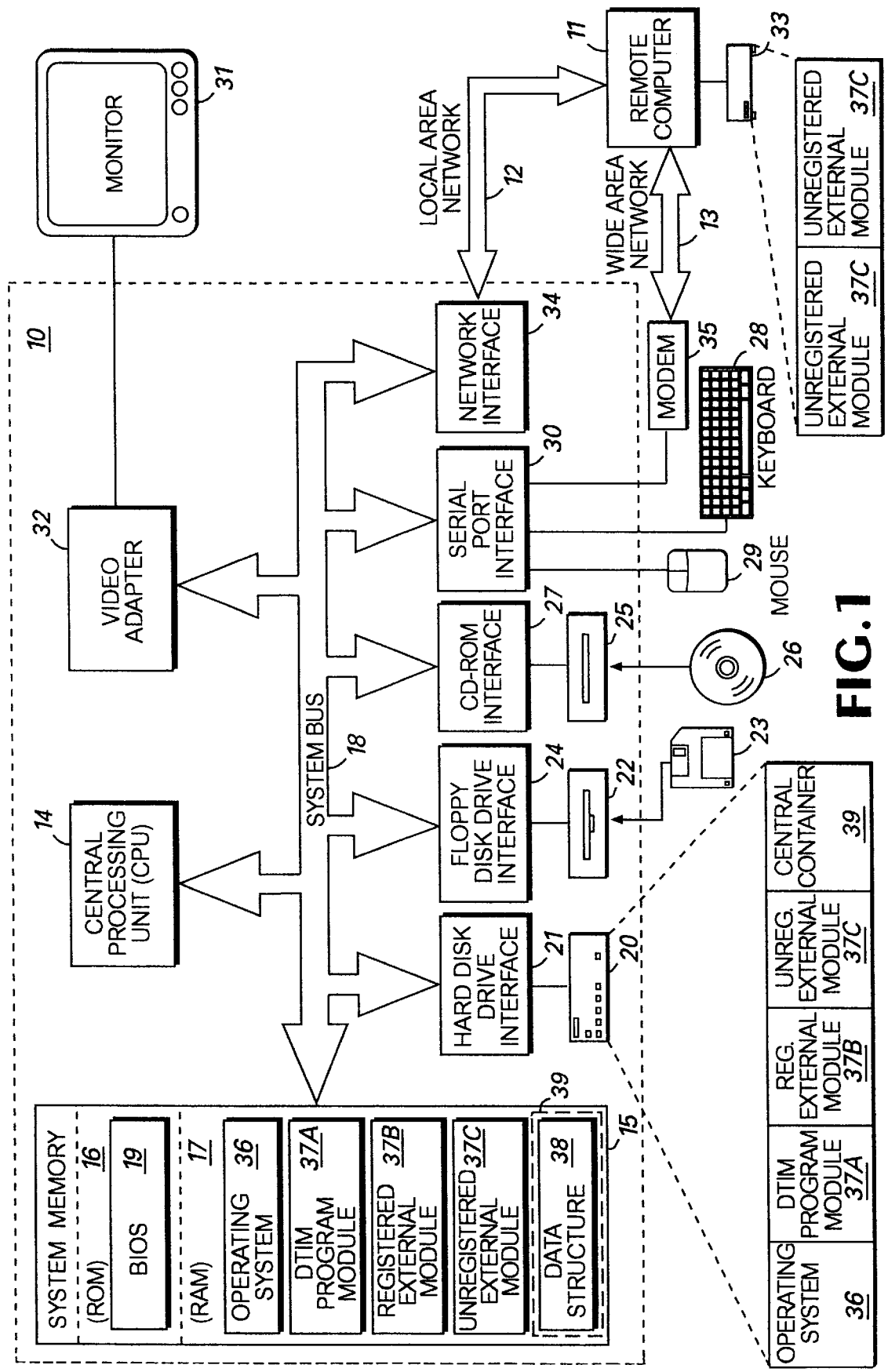
FIG. 1 is a block diagram of a personal computer that provides the operating environment for the preferred embodiment of the present invention.

The present invention is directed to a system for selectively recording a data structure associated with an action by one of a group of predetermined program modules and viewing the data structure in relation to previously recorded data structures. The preferred embodiment of the present invention is represented by "OUTLOOK", a desktop information manager program developed by Microsoft Corporation of Redmond, Wash.

Briefly described, the desktop information manager (DTIM) program module allows users to manage their own calendar, tasks or "to-do" list, notes, contacts, and electronic mail messages in an integrated fashion. Users are able to "journal" or record and keep track of important things the user does (e.g., open a word processing document), sends (e.g., an electronic mail message), or receives (e.g., an electronic mail message). Information about such actions is recorded in a data structure called a journal entry. In this manner, a user essentially has the equivalent of an electronic assistant that records only information that is important or interesting to the user.

Additionally, users can view information about these important actions by viewing a representation of the data structure and representations of previously recorded data structures in several view formats. Formats include, but are not limited to, a tabular format and a timeline format. The timeline format is particularly useful because the user can group the data structure representations in relation to each other along a timeline according to a selected data field of each data structure.

Although the preferred embodiment will be generally described in the context of a DTIM program and an operating system running on a personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks, enterprise-wide computer networks, and the global Internet.

The detailed description which follows is represented largely in terms of processes and symbolic representations of operations by conventional computer components, including a central processing unit (CPU), memory storage devices, connected display devices, and input devices. Furthermore, these processes and operations may utilize conventional computer components in a heterogeneous distributed computing environment, including remote file servers, compute servers, and memory storage devices. Each of these conventional distributed computing components is accessible by the CPU via a communication network.

The processes and operations performed by the computer include the manipulation of signals by a CPU and the maintenance of these signals within data structures resident in one or more memory storage devices. In the context of the present invention, a data structure is an organizational scheme, such as a record or an list, that encapsulates data to support data interpretation and data operations. A representation of such a data structure can be a graphical image, such as an icon, a data field containing encapsulated data, or both an image and a data field. The data structure imposes a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to representations of these signals as bits, bytes, words, information, elements, symbols, characters, numbers, points, records, entries, objects, images, files or the like. It should be kept in mind, however, that these and similar terms are associated with appropriate physical quantities for computer operations, and that these terms are merely conventional labels applied to physical quantities that exist within and during operation of the computer.

In general, a program module may use an interprocess communication to communicate with another program module. An interprocess communication is the ability of a task or process to exchange data with another task or process. Examples of such interprocess communications readily recognized by those skilled in the art include the use of pipes, semaphores, shared memory, and remote procedure calls (RPCs). In the preferred embodiment, a program module calling an application programming interface (API) to write information to a temporary file in memory, which is then read by the preferred DTIM program module, is one such interprocess communication.

It should also be understood that manipulations within the computer are often referred to in terms such as adding, comparing, moving, filtering, separating, placing, altering, etc. which are often associated with manual operations performed by a human operator. The operations described herein are machine operations performed in conjunction with various input provided by a human operator or user that interacts with the computer.

In addition, it should be understood that the programs, processes, methods, etc. described herein are not related or limited to any particular computer or apparatus, nor are they related or limited to any particular communication architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, aspects of the present invention and the preferred operating environment will be described.

The Operating Environment

Figure 2:
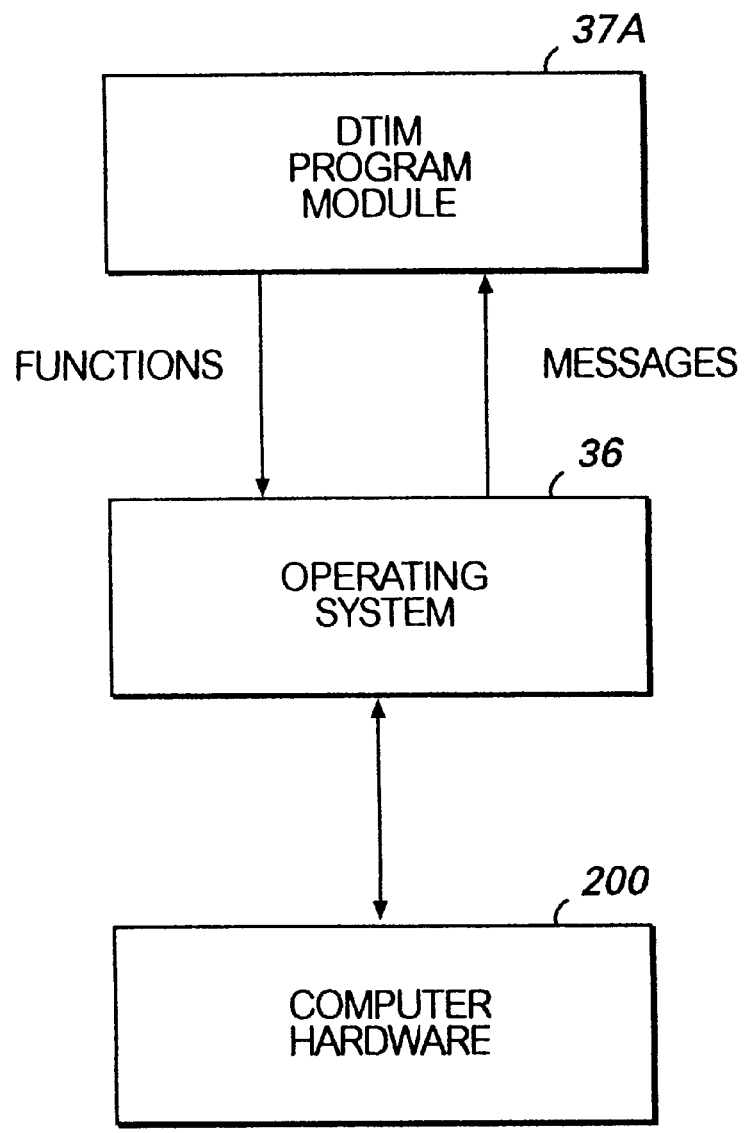
FIG. 2 is a block diagram illustrating an interface between a computer's input/output devices, an operating-system, and a program module.

FIGS. 1 and 2 illustrate various aspects of the preferred computing environment in which the present invention is designed to operate. Those skilled in the art will immediately appreciate that FIGS. 1 and 2 and the associated discussion are intended to provide a brief, general description of the preferred computer hardware and program modules, and that additional information is readily available in the appropriate programming manuals, user's guides, and similar publications.

FIG. 1 illustrates a conventional personal computer 10 suitable for supporting the operation of the preferred embodiment of the present invention. As shown in FIG. 1, the personal computer 10 operates in a networked environment with logical connections to a remote computer 11. The logical connections between the personal computer 10 and the remote computer 11 are represented by a local area network 12 and a wide area network 13. Those of ordinary skill in the art will recognize that in this client/server configuration, the remote computer 11 may function as a file server or compute server.

The personal computer 10 includes a central processing unit (CPU) 14, preferably the 80486 or "PENTIUM" microprocessors manufactured by Intel Corporation of Santa Clara, Calif. However, it should be understood that the invention can be implemented on computers based upon other microprocessors, such as the "MIPS" family of microprocessors from the Silicon Graphics Corporation, the "POWERPC" family of microprocessors from both the Motorola Corporation and the IBM Corporation, the "PRECISION ARCHITECTURE" family of microprocessors from the Hewlett-Packard Company, the "SPARC" family of microprocessors from the Sun Microsystems Corporation, or the "ALPHA" family of microprocessors from the Digital Equipment Corporation.

The personal computer 10 also includes system memory 15 (including read only memory (ROM) 16 and random access memory (RAM) 17), which is connected to the CPU 14 by a system bus 18. The BIOS 19 for the personal computer 10 is stored in ROM 16. Those skilled in the art will recognize that the BIOS 19 is a set of basic routines that helps to transfer information between elements within the personal computer 10. However, it should be appreciated that other types of computers may transfer information between elements within the computer without the use of a BIOS 19 and that the invention can readily be implemented in such computers without a BIOS 19.

Within the personal computer 10, a hard disk drive 20 is connected to the system bus 18 via a hard disk drive interface 21. A floppy disk drive 22, which is used to read or write a floppy disk 23, is connected to the system bus 18 via a floppy disk drive interface 24. A CD-ROM drive 25, which is used to read a CD-ROM disk 26, is connected to the system bus 18 vis;a CD-ROM interface 27. A user enters commands and information into the personal computer 10 by using a keyboard 28 and/or pointing device, such as a mouse 29, which are connected to the system bus 18 via a serial port interface 30. Other types of pointing devices (not shown in FIG. 1) include track pads, track balls, joy sticks, data gloves, head trackers, and other devices suitable for positioning a cursor on a computer monitor 31. The monitor 31 or other kind of display device is connected to the system bus 18 via a video adapter 32.

The remote computer 11 in this networked environment is connected to a remote memory storage device 33. This remote memory storage device 33 is typically a large capacity device such as a hard disk drive, CD-ROM drive, magneto-optical drive or the like. The personal computer 10 is connected to the remote computer 11 by a network interface 34, which is used to communicate over the local area network 12.

As shown in FIG. 1, the personal computer 10 is also connected to the remote computer 11 by a modem 35, which is used to communicate over the wide area network 13, such as the Internet. The modem 35 is connected to the system bus 18 via the serial port interface 30. Although illustrated in FIG. 1 as external to the personal computer 10, those of ordinary skill in the art will quickly recognize that the modem 35 may also be internal to the personal computer 11, thus communicating directly via the system bus 18. It is important to note that connection to the remote computer 11 via both the local area network 12 and the wide area network 13 is not required, but merely illustrates alternative methods of providing a communication path between the personal computer 10 and the remote computer 11.

Although other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that program modules and data are provided to the personal computer 10 via one of the local or remote memory storage devices or computer-readable media, which may include the hard-disk drive 20, floppy disk 23, CD-ROM 26, RAM 17, ROM 16, the remote memory storage device 33, and digital tapes (not shown). In the preferred embodiment, these program modules include an operating system 36, and the DTIM program module 37a. External to the DTIM program module 37a are other program modules, such as a registered external module 37b and an unregistered external program module 37c. These program modules are considered to be "external" because neither the registered external program module 37b nor the unregistered external program module 37c are integrated program modules of the DTIM program module 37a. A "registered" external program module 37b can report an action associated with the particular external program module 37b to the DTIM program module 37a for tracking purposes. In contrast, an "unregistered" external program module 37c cannot report an action associated with the particular external program module 37c to the DTIM program module 37a. In the preferred personal computer 10, the hard disk drive 20 is used to store these program modules once they are installed from a CD-ROM 26.

As previously mentioned, data is stored on one of the memory storage devices, such as the hard disk drive 20 or the floppy disk 23. In the preferred embodiment, data is stored in a data structure 38, also known as a journal entry, on the hard disk drive 20. This data structure 38 is maintained on the hard disk drive 20 in a central container 39, also called a folder. A central container is equivalent to a directory and is a means of organizing files, program modules, and data structures on a memory storage device. A central container can be graphically represented on a user interface presented on a computer monitor 31.

FIG. 2 is a simplified block diagram illustrating the interaction between the computer hardware 200, the operating system 36, and a program module, such as the DTIM program module 37a. Referring now to both FIGS. 1 and 2, when the personal computer 10 is turned on or reset, the Basic Input/Output System (BIOS) 19, which is stored in the ROM 16, instructs the CPU 14 to load the operating system 36 from the hard disk drive 20 into the RAM 17. Once the operating system 36 is loaded into RAM 17, the CPU 14 executes the operating system 36 and causes the visual elements associated with the user interface of the operating system 36 to be displayed on the monitor 31.

The operating system 36, in conjunction with the BIOS 19 (FIG. 1) and associated device drivers, provides the basic interface between the computer's resources, the user, and the DTIM program module 37a. The operating system 36 interprets and carries out instructions issued by the user. For example, when the user wants to load a program module, such as the DTIM program module 37a, the operating system 36 interprets the instruction (e.g., double clicking on the program module's icon) and causes the CPU 14 to load the program code into RAM 17 from either the hard disk drive 20, floppy disk 23, CD-ROM 26, or the remote memory storage device 33. Once the program module 37a is loaded into the RAM 17, it is executed by the CPU 14. In case of large programs, the CPU 14 loads various portions of program modules into RAM 17 as needed.

As discussed earlier, the preferred embodiment of the present invention is embodied in the DTIM program module 37a, which is designed to operate in conjunction with Microsoft Corporation's "WINDOWS 95" or "WINDOWS NT" operating systems. However, it should be understood that the invention can be implemented for use with other operating systems, such as Microsoft Corporation's "WINDOWS 3.1" operating system, IBM Corporation's "OS/2" operating system, and the operating system used in "MACINTOSH" computers manufactured by Apple Computer, Inc.

The operating system 36 provides a variety of functions or services that allow a program module, such as the DTIM program module 37a, to easily deal with various types of input/output (I/O). This allows program modules to issue relatively simple function calls that cause the operating system 36 to perform the steps required to accomplish various tasks, such as displaying text on the monitor 31 (FIG. 1) or printing text on an attached printer (not shown). Generally described (with reference to FIG. 2), the DTIM program module 37a communicates with the operating system 36 by calling predefined functions provided by the operating system 36. The operating system 36 responds by providing the requested information in a message or by executing the requested task. Furthermore, it should be understood that the above-described interaction can also occur between the operating system 36 and other program modules as well, such as the registered external program module 37b and the unregistered external program module 37c.

From this brief description, it should be appreciated that operating systems, such as the "WINDOWS 95" and "WINDOWS NT" operating system, are quite complex and provide a wide variety of services that allow users and programs to utilize the resources available in the personal computer. Those skilled in the art will be familiar with operating systems and their various features, which include, but are in no means limited to, the specific messages and functions described above. For more comprehensive information regarding the "WINDOWS 95" and "WINDOWS NT" operating system and its interaction with programs, the reader may refer to any of a variety of publications, including the "Win32 Programmer's Reference" and "Advanced Windows", both published by Microsoft Press.

Likewise, those skilled in the art will appreciate that the preferred DTIM program module provides a wide variety of features and functions in addition to those included in the brief description presented above.

The Preferred DTIM Program Module

Figure 5:
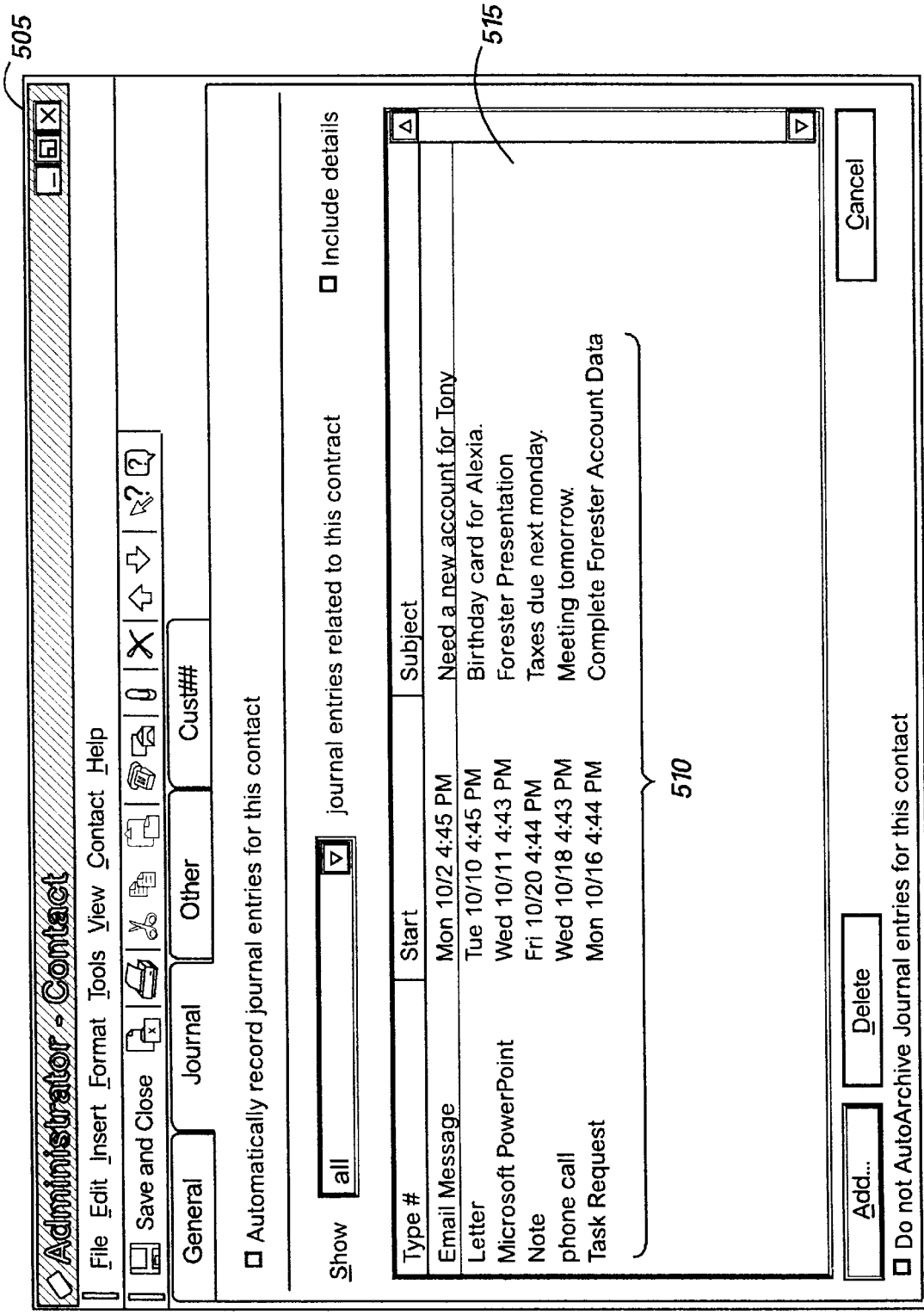
FIG. 5 is a screen display showing a group of data structures displayed in a tabular format in accordance with the preferred embodiment of the present invention.
Figure 6:
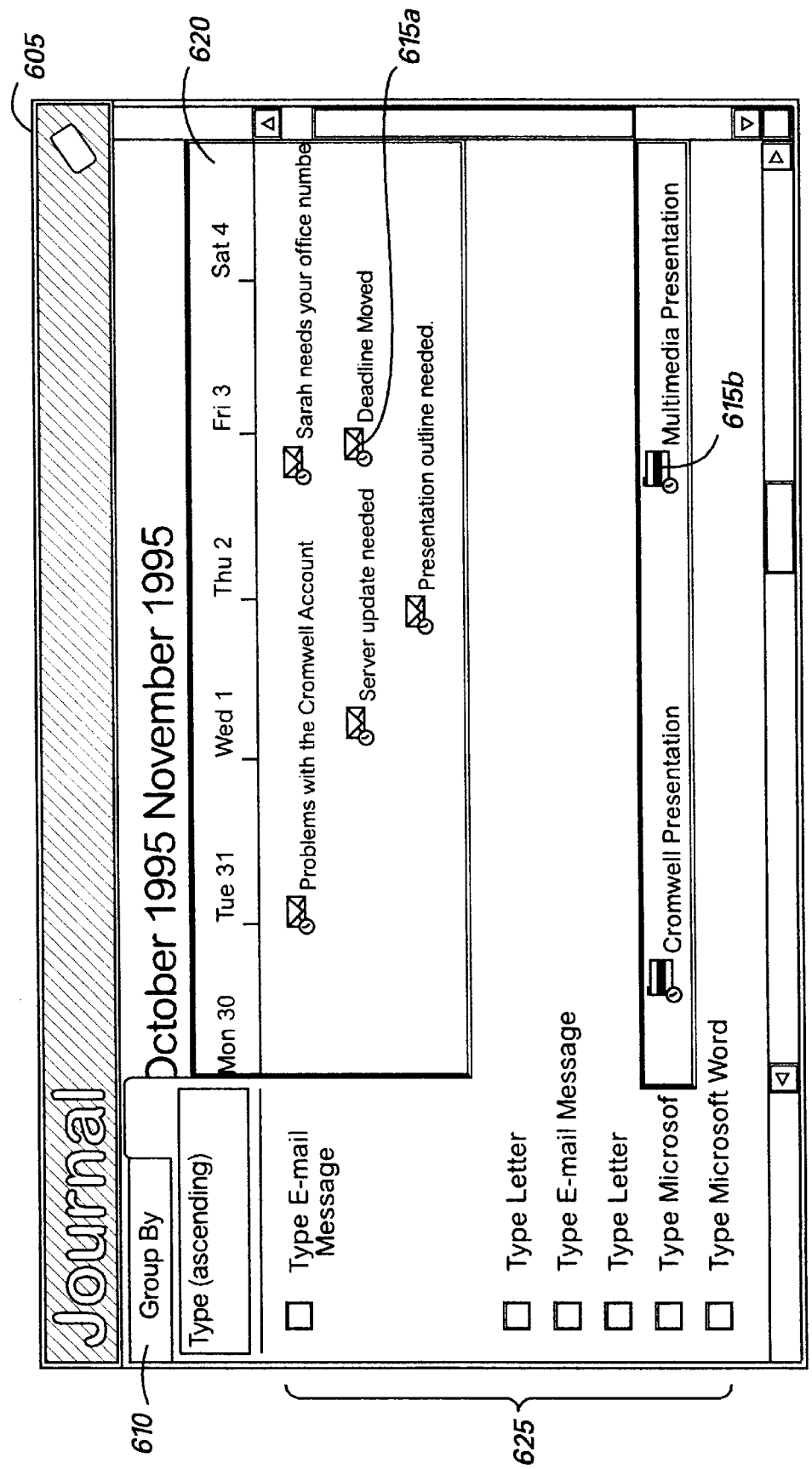
FIG. 6, are screen displays showing a group of data structures arranged and displayed in a timeline format in accordance with the preferred embodiment of the present invention.
Figure 7:
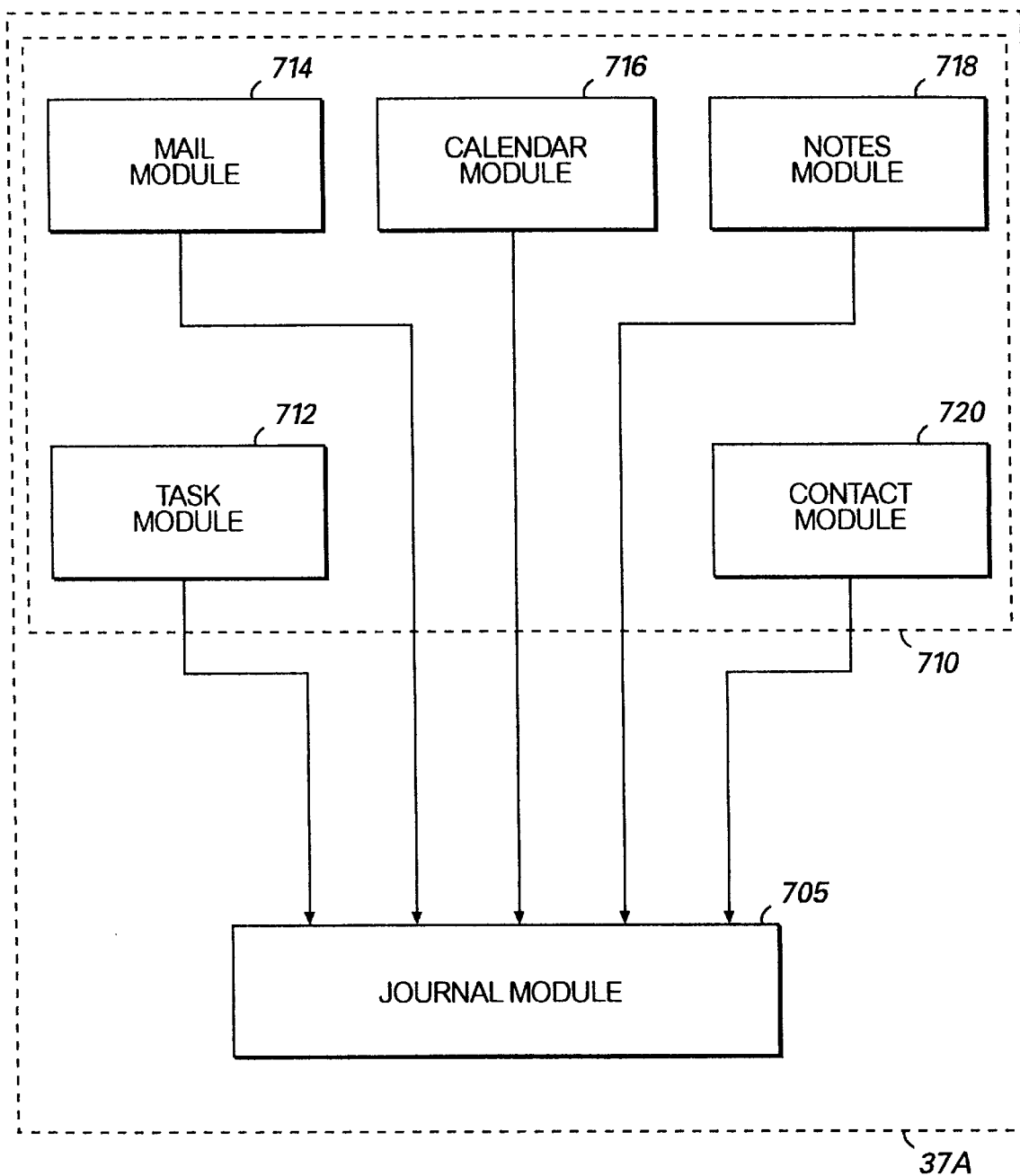
FIG. 7 is a block diagram illustrating internal program modules of the preferred embodiment which can report actions to another module within a desktop information manager program module.
Figure 8:
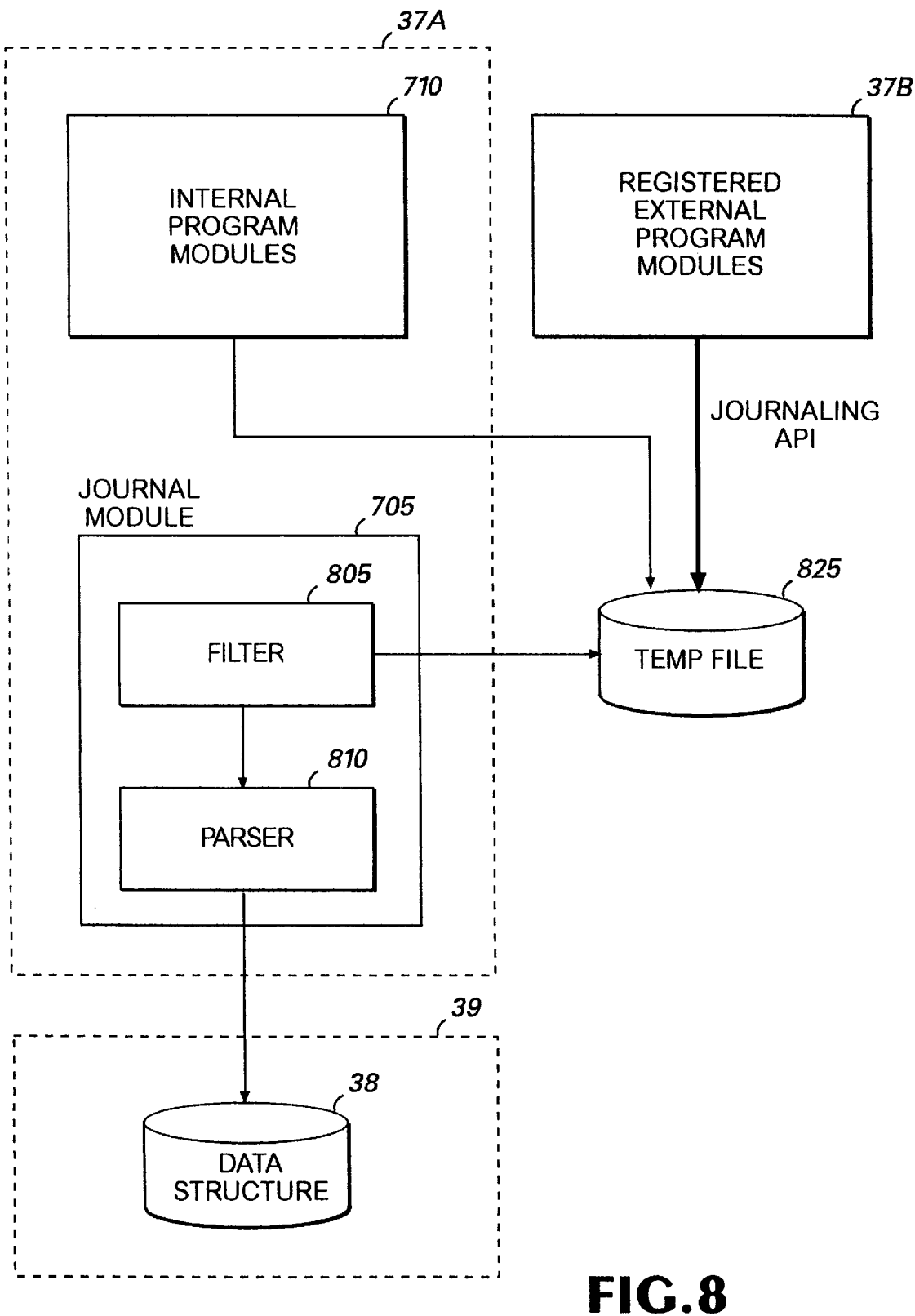
FIG. 8 is a block diagram illustrating the preferred components for recording a data structure in memory in response to an action associated with either an internal program module or a registered external program module.
Figure 9:
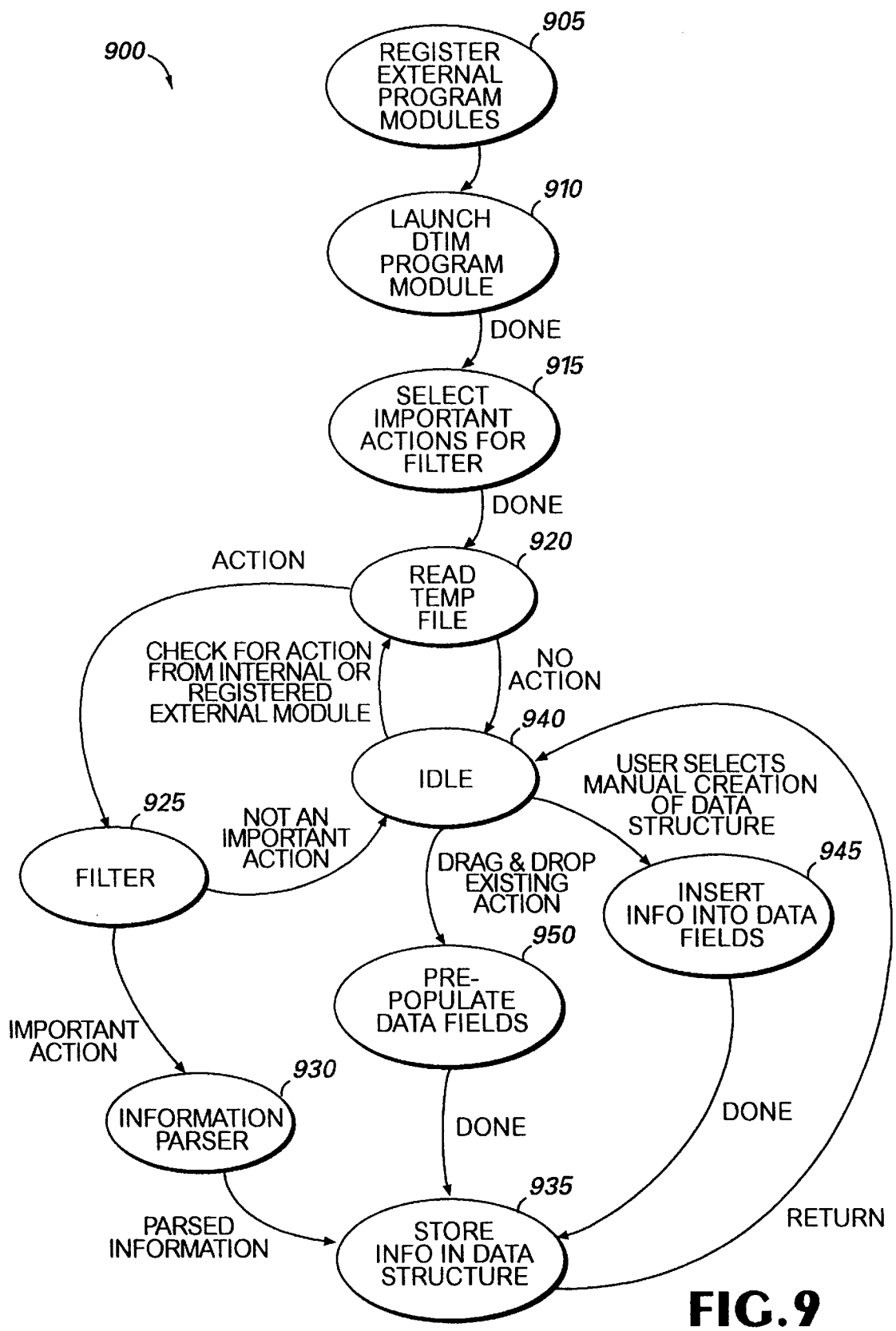
FIG. 9 is a state diagram illustrating the preferred method for selectively recording a data structure associated with an action by either an internal program module or a registered external program module.
Figure 10:
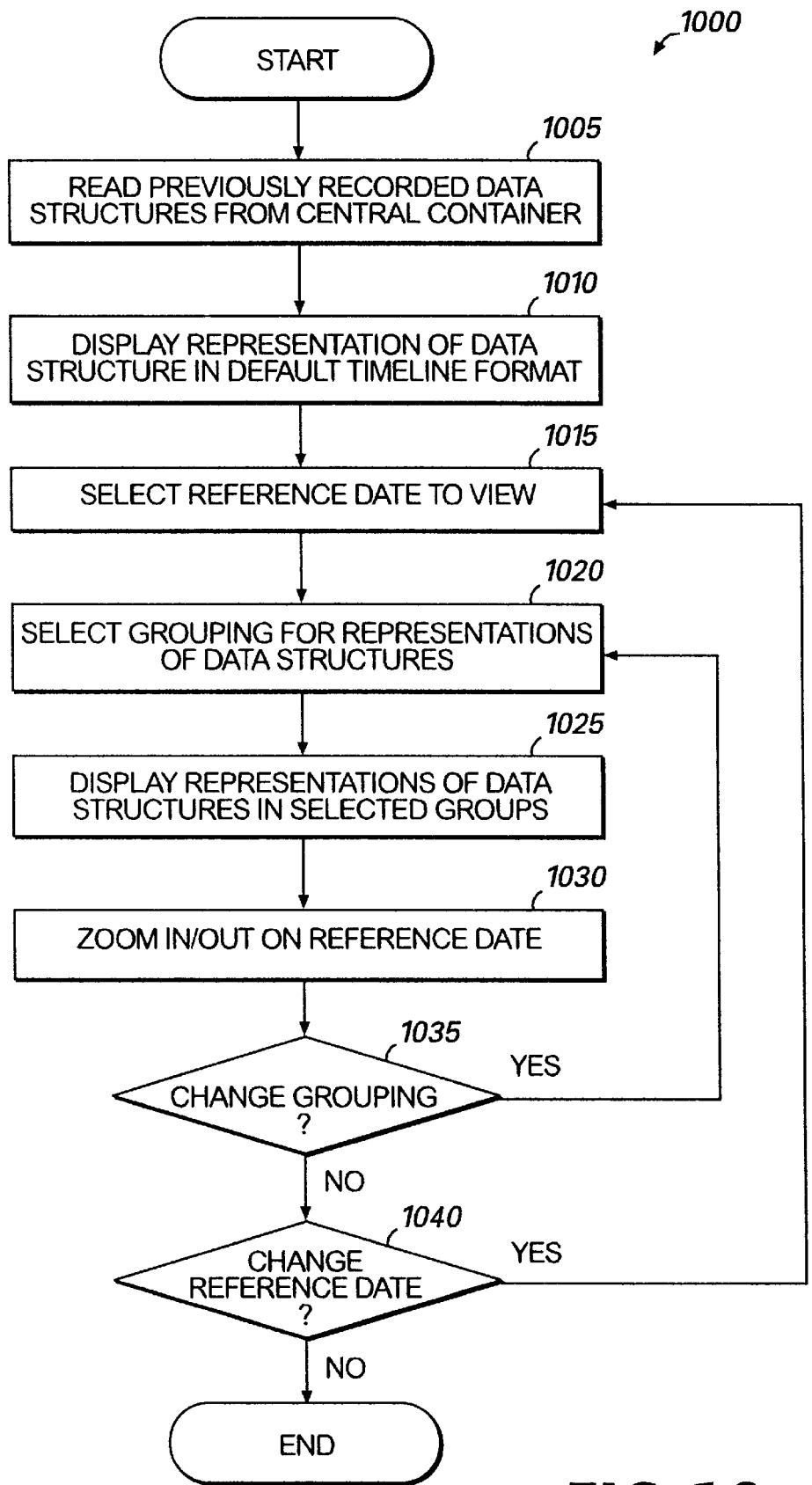
FIG. 10 is a flow diagram illustrating steps of the preferred method for viewing representations of recorded data structures along a chronological timeline in selectable related groupings.

Turning now to FIGS. 3–10, the preferred embodiment of the present invention is described. FIGS. 3–6 are screen displays illustrating the user interface for use with the preferred embodiment of the present invention. FIG. 7 is a block diagram generally illustrating the different program modules within the preferred embodiment. FIG. 8 and FIG. 9 are a block diagram and state diagram, respectively, illustrating the preferred method for reporting an important action associated with either an internal program module or an external program module and recording a data structure in response to the important action. FIG. 10 is a flowchart describing steps taken by a user to view a representation of a data structure on the user interface of a computer.

As mentioned above with regard to FIG. 1, the preferred embodiment of the present invention is a DTIM program module 37a which allows users to manage their own calendar, tasks or "to-do" list, notes, contacts, and electronic mail messages in an integrated fashion. Users are able to record a data structure 38, known as a journal entry, to keep track of important actions the user does or receives. An action is essentially an event, such as receiving an electronic mail message, associated with a program module. The program module associated with the action may be a program module internal or external to the DTIM program module 37a. Typical external program modules 37b include, but are not limited to, a word processing program and a spreadsheet program.

In order to record a data structure in response to actions from an external program module 37b, the external program module 37b must first be registered with the DTIM program module 37a. In this manner, the DTIM program module 37a can expect reported actions from the external program module 37b and can determine if a data structure 38 should be recorded associated with actions by the external program module 37b. Unregistered external program modules 37c are typically registered with the DTIM program module 37a when the unregistered external program module 37c is installed on the hard disk drive 20 of the computer 10. This registration process is discussed in more detail below with regard to FIG. 8.

To support tracking of important actions, the user is able to selectively choose which actions are important. In the preferred embodiment, the user chooses important actions by specifying the event and a contact or person's name associated with the event. For example, an important action could be the arrival of electronic mail messages from the user's boss. However, it is contemplated that important actions could be specified by selecting only the event or by specifying the event in combination with other parameters associated with the event, such as a project name. When an important action occurs, information associated with the important action is recorded in a data structure 38. A data structure 38 can also be recorded by filling out data entry fields or by a conventional drag & drop technique for an action other than a selected "important" action occurs. These alternative methods of recording a data structure are discussed in more detail below with regard to FIGS. 4 and 9.

Once the data structure 38 is recorded in memory, users can view representations of the data structure 38 along with representations of previously recorded data structures. A representation of a data structure can be a graphical image, text, or a combination of both. The representation of the data-structure 38 is viewed on the user interface of the computer 10 in either a tabular format or a horizontally grouped timeline format.

Figure 3:
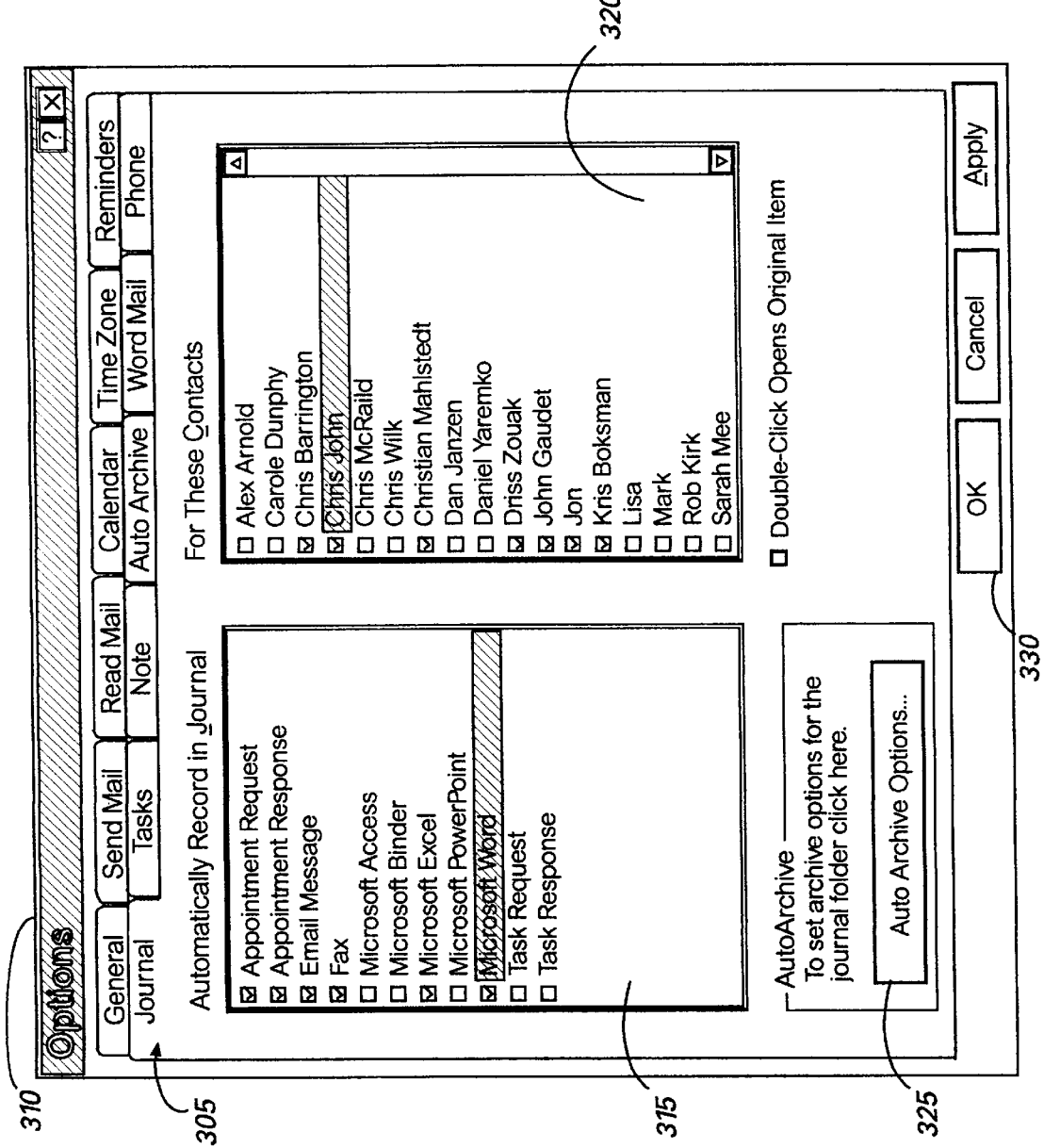
FIG. 3 is a screen display for supporting selection of important actions in accordance with the preferred embodiment of the present invention.

FIGS. 3–6 are screen displays illustrating the user interface for use with the preferred embodiment of the present invention. Before any actions are recorded, the user must first select which actions the user considers sufficiently important to be automatically tracked. FIG. 3 is a screen display supporting this selection process.

Referring now to FIGS. 1 and 3, a Journal Selection page 305 is illustrated within the Options Dialog 310 on the user interface presented on the monitor 31. On the left side of the Journal Selection page 305 is the Event Selection area 315, where the user is able to select events associated with specific program modules that are important by placing the cursor on the action and clicking a button on the mouse 29. Similarly, on the right side of the Journal Selection page 305 is the Contact Selection area 320, where the user is able to select specific contact names that are important to the user. Thus, important actions are defined by the selected events in the Event Selection area 315 and the selected contacts in the Contact Selection area 320. For example, a user could decide that only electronic mail messages, telephone calls, word processing documents, and appointments associated with their manager, assistant, and spouse are important enough to record. By allowing the user to selectively choose which actions are important, the resulting recorded data structure 38 is more useful to the user.

The important actions listed in the Event Selection area 315 and Contact Selection area 320 are associated with program modules. As previously discussed, program modules may be internal to the DTIM program module 37a or they may be external to the DTIM program module 37a. The DTIM program module 37a automatically displays events in the Event Selection area 320 for each of the internal program modules.

Despite the ability to select which actions are important, continuous recording of data structures 38 as described above will create data structures 38 in memory until there is no more free space or available memory left on the hard disk drive 20. Therefore, the preferred embodiment provides an Auto Archive feature selectable by activating the Auto Archive Options dialog 325. When this feature is turned on, a data structure 38 can be automatically deleted after a predetermined amount of time. In the preferred embodiment, this predetermined amount of time is set to 120 days by default.

In summary, the user is able to see which external program modules 37b are registered and to select which actions are sufficiently important to the user. If the selections are correct, the user would then click on the "OK" button 330. After these important actions are selected, a data structure 38 (known as a journal entry in the preferred embodiment) can be automatically recorded whenever an important action occurs. When a data structure 38 is recorded in memory (e.g., the hard disk drive 20, the floppy disk 23, or RAM 17), the data structure 38 is maintained along with other previously recorded data structures in a central container 39 or folder.

FIG. 4 is a screen display showing data fields for a data structure in accordance with the preferred embodiment of the present invention. Referring now to FIGS. 1 and 4, an inspector dialog 405 is displayed showing a series of data fields 410a–i for a data structure 38. Each data structure 38, also called a journal entry, can include information in these predetermined data fields 410a–i. A "Subject" data field 410a contains information that provides a description of the action associated with the data structure 38. A "Type" data field 410b describes the type of action associated with the data structure 38. A "Contact" data field 410c and a "Company" data field 410d, respectively, contain the name and associated company of the contact related to the data structure 38. A "Date" data field 410e contains the date the data structure 38 was recorded. A "Time" data field 410f contains the time of day the action associated with the data structure 38 was sent, received, created, or modified. A "Duration" data field 410g contains information on how long the action associated with the data structure 38 lasted. A "Category" data field 410h can show information describing a user-definable association parameter, such as a particular project related to the data structure 38. A "Notes" data field 410i can accept notes from the related action or notes entered by the user to appear along with an icon 415 representing the data structure 38. Double clicking on the icon 415 activates the related action so that the user can view information from the related action on the user interface of the computer.

In addition to being abbe to automatically record a data structure 38, the preferred program also allows a user to prompt the DTIM program module 37a to record a data structure 38 in several other ways. The user can prompt the DTIM program module 37 to record a data structure 38 in memory by individually filling out each of the data fields 410a–i shown in the inspector dialog 405. Alternatively, the user may use a more efficient process of prompting the DTIM program module 37a to record a data structure 38 for an already existing action. This is accomplished by selecting a graphical representation of the existing action, such as an icon, with the mouse 29 and "dragging and dropping" the graphical representation onto a graphical image of the central container 39.

For example, an electric mail message from a colleague may not have been previously deemed as an important action. However, circumstances may have changed and the colleague is now the user's boss. The user now considers this existing action as important. The user can select the icon representing the electronic mail message and drag the icon onto the image of the central container 39. A data structure 38 is then created containing information related to the electronic mail message. Thus, a data structure 38 can be recorded for actions that do not easily lend themselves to automatic recording, such as normal verbal conversations, sending or receiving a hard copy of a document, or the duration of a task or appointment.

In the preferred embodiment of the present invention, there are a variety of formats for viewing a representation of a data structure 38. FIGS. 5 and 6 illustrate two formats for viewing a representation of a data structure 38. FIG. 5 is a screen display from an embodiment of the present invention showing a group of data structures displayed in a tabular format. FIG. 6 is a screen display from an embodiment of the present invention showing a group of data structures arranged and displayed in a timeline format.

Referring now to FIG. 5, the tabular format for viewing a representation of a data structure 38 (FIG. 1) is shown in a Table View 505 which lists a series of recorded data structures 510. The recorded data structures 510 are displayed in a spreadsheet-like manner by displaying each data structure 510 on a row, and presenting specific data fields of each data structure 510 in a column.

The timeline format for viewing a representation of a data structure 38 is illustrated in the Timeline View 605 of FIG. 6. In general, this format allows different pieces of information to be displayed on a horizontal timeline in relation to one another. More particularly, the preferred embodiment allows the user to group recorded data structures according to a predefined data field, such as type, contact, subject, and category.

A, a reference date must be initially selected for the Timeline View 605. A miniature calendar dialog is displayed prompting the user to select a reference date to view along a timeline 620. Once the reference data is selected, the group of data structure representations are arranged and displayed in the timeline format. Representations of data structures recorded before and after the reference date can be viewed.

Referring now to FIGS. 1 and 6, each data structure 38 is represented as an icon 615a–b along a timeline 620 in one of the specified groups 625. For example, in FIG. 6, the data structure representations 615a–b are illustrated as being grouped according to the type of data structure 38, such as an electronic mail message 615a or meeting request 615b.

By grouping representations of recorded data structures 615a–b along the timeline 620, it allows users to view any of their actions, such as sending electronic mail messages, scheduling meeting request, or creating documents, in relation to when the action occurred. Furthermore, it allows a user to easily search for an unknown action in relation to when another known action occurred. For example, Jennifer may have been scheduled a meeting but can't remember when. She does remember that she was scheduled it around the time she received an important electronic mail message concerning a deadline. With the use of the Timeline View 605, Jennifer can group the data structure representations 615a–b according to type of action. As a result, she can look along the timeline at representations of data structures 615a–b for electronic mail messages, locate the data structure representation 615a related to the deadline electronic mail message, and then find the data structure representation 615b related to the meeting request she requires.

FIG. 7 is a block diagram illustrating the internal program modules of the preferred DTIM program module 37a. Referring now to FIG. 7, the DTIM program module 37a contains a number of integrated program modules, including a journal module 705 and a group of internal program modules 710. This group of internal program modules 710 preferably comprises a task module 712, a mail module 714, a calendar module 716, a notes module 718, and a contact module 720. Although the preferred embodiment uses these specific program modules 712–720, the present invention is not limited to this implementation.

The task module 712 maintains a task or "to-do" list and tracks how a user is progressing on each task. The task module 712 is able to report to the journal module 705 with progress on a task, completion of a task, and when a task is overdue.

The mail module 714 manages a user's electronic mail. It is able to report to the journal module 705 when the user has sent or received electronic mail messages.

The calendar module 716 keeps appointment information for the user. It is able to report to the journal module 705 when appointments are requested, canceled, and when a response to a requested appointment is sent.

In the preferred embodiment, a Messaging Application Programming Interface (MAPI) store is used for storing and linking information contained in each of the internal program modules 710. Those skilled in the art will recognize that MAPI is a set of APIs customized for object-oriented operations on electronic messages, such as opening, closing, sending, receiving, and storing. In general, the internal program modules 710 store information as MAPI data structures, which are essentially objects in an extensible, object-oriented database called a MAPI store. Although the preferred embodiment uses MAPI as a data storage mechanism, the present invention is not limited to this implementation. One skilled in the art will recognize that other storage subsystems may be used to store and link information, including but not limited to OLE automation, file allocation table (FAT) folders, and databases accessed via open database connectivity (ODBC).

Thus, the journal module 705 operates to keep track of actions performed by each of the internal program modules 710 by filtering the unimportant actions so that only the important actions are tracked. Furthermore, the journal module 705 can also record a data structure 38 in response to important actions associated with external program modules. This process is described in more detail in FIG. 8 and FIG. 9.

FIG. 8 is a block diagram illustrating the preferred components for recording a data structure 38 in memory in response to an action by either an internal program module 710 (FIG. 7) or a registered external program module 37b (FIG. 1). Referring now to FIGS. 1, 7, and 8, the internal program modules 710 report actions to a temporary file 825 via an interprocess communication. For internal program modules 710, this interprocess communication is preferably implemented by an application programming interface (API) called MsoLogDocumentEvent. The MsoLogDocumentEvent API is essentially an interface for logging or storing information relating to an action by one of the internal program modules 710. The MsoLogDocumentEvent API defines two data types that are stored, MSOEVT and PMSOFPR.

MSOEVT maintains enumerated parameters corresponding to a description of the internal action being logged or stored. The MSOEVT enumerated parameters correspond to creating a new file, opening a file, saving the current file, saving as a new file or a different file, routing a file, printing a file, closing a file, sending or mailing a file and posting a file.

PMSOFPR is a user-defined structure containing the properties of the action being reported by one of the internal program modules 710, as follows:

a file link as a pointer to the action in memory,
  a subject of the action, a keyword for the action, a company of the contact related to the action, a recipient of the action, a start time for the action, an end time for the action, Boolean flags concerning the action (fsaved, fprinted, frouted, and fposted)

Therefore, as a result of using the MsoLogDocument-Event API, information about the related action is stored in the temporary file 825 in memory, preferably RAM 15. Thus, the stored information includes the following information or properties related to the action:

a description of the action, a file link as a pointer to the action in memory, a subject of the action, a keyword for the action, a company of the contact related to the action, a recipient of the action, a start time for the action, an end time for the action, Boolean flags concerning the action (fsaved, fprinted, frouted, and fposted)

Similarly, actions associated with registered external program modules 37b can be reported to the temporary file 825 in memory. As previously mentioned, examples of external program modules 37b include word processing or spreadsheet programs. An external program module 37b must first be registered with the DTIM program module 37a in order to report actions to the temporary file 825. This registration process occurs when an external program module 37b is installed on the computer hard disk drive 20. A list of registered external program modules 37b is kept in a registry listing called JournalMePlease. This registry listing is maintained by the DTIM program module 37a. In this registry listing, certain information about each of the registered external program modules 37b is maintained as follows:

the name of the registered external program module, a flag which indicates the external program module is enabled to report actions, and a small and large icon representing the external program module.

A registered external program module 37b reports an action to the temporary file 825 using another interprocess communication. In the preferred embodiment, this other interprocess communication is MsocLogDocumentEventFpr, an API known as a Journaling API. Similar to API used for internal program modules 710, the Journaling API defines two data types that are stored, MSOCEVT and PMSOCFPR.

MSOCEVT, similar to MSOEVT described above, maintains enumerated parameters corresponding to a description of the external action being logged or stored. The MSOCEVT enumerated parameters correspond to creating a new file, opening a file, saving the current file, saving as a new or different file, routing a file, printing a file, closing a file, sending or electronically mailing a file and posting a file.

PMSOCFPR, similar to PMSOFPR described above, is a user-defined structure containing the properties of the action being reported by a registered external program modules 37b, as follows:

a file link as a pointer to the action in memory, a subject of the action, a keyword for the action, a company of the contact related to the action, a recipient of the action, a start time for the action, an end time for the action, Boolean flags concerning the action (fsaved, fprinted, frouted, and fposted)

The Journaling API is called by a registered external program module 37b. The calling program module 37b provides information related to the action, via the data types described above. However, the external program module 37b using the Journaling API is not required to provide information for all the listed properties described above. Those skilled in the art will appreciate that this provides some flexibility as to the reporting requirements for the calling program module 37b.

Each time one of the registered external program modules 820 reports an action via the Journaling API, the enabling flag for the registered external program module 37b is checked. If the flag corresponding to the reporting registered external program module 37b indicates the program module 37b is enabled to report actions, the information related to the action (as described above) is sent to the temporary file 825. In this manner, the temporary file 825 in memory acts as a buffer and a registered external program module 37b is able to report an action without requiring the DTIM program module 37a to be concurrently running. Thus, as a result of using the Journaling API, information about the action by a registered external program module 37b is stored in the temporary file 825 in memory, preferably RAM 15.

The user is able to turn off the capability of the registered external program module 37b to report actions by preferably making a selection using a dialog box on the user interface displayed on the monitor 31 (FIG. 1) or by toggling the associated enabling flag in the registry listing. Although the preferred embodiment uses the Journaling API as an interprocess communication mechanism to report external actions, the present invention is not limited to this implementation.

Once an action has been reported to the temporary file 825 in memory, a filter module 805 within the journal module 705 reads the temporary file 825 and checks for a reported action. The reported action is an important action if the filter module 805 determines the action is one of the selected events from one of the selected contacts, as described with respect to FIG. 3. If the reported action is an important action, then the filter module 805 passes information associated with the reported action to the property separator module 810.

The property separator module 810, also within the journal module 705, takes the collective information associated with the important action and stores parts of the information (discrete properties) in the predetermined data fields 410a–i as described in FIG. 4. In the preferred embodiment, the discrete properties of the important action are collectively stored within an object in the temporary file 825. Thus, each discrete property of the important action is read from the stored information (object) in the temporary file 825 and copied into a corresponding data field 410a–i of a data structure 38 in memory.

As previously mentioned with regard to FIGS. 1 and 4, a user can prompt the DTIM program module 37a to record a data structure 38 in several ways. In the preferred embodiment, by selecting the menu command, File.New__Item.Journal__Entry, from the DTIM program module 37a, the user can insert information in each of the data fields 410a–i shown in the inspector dialog 405. The information inserted into each of the data fields 410a–i is then stored as a data structure 38 in memory.

Additionally, the preferred program provides an efficient process of manually recording a data structure 38 for an already existing action. This process is referred to as "coercion" and can be implemented with a menu command or via a conventional drag & drop technique. Using the drag & drop technique, a user selects an icon representing an already existing action, such as an electronic mail message or a document, by placing a cursor on the icon and pressing a left button on the mouse 29. While still depressing the left button on the mouse 29, the user drags the icon onto a representation of the central container 39. In this manner, the "Subject" data field 410a and the "Type" data field 410b of the data structure 38 are pre-populated with information associated with the already existing action. Each part of the preferred program has a menu command, Record_in_ Journal, which implements the "coercion" process for a preselected existing action without the need to perform the "drag & drop" steps. Those skilled in the art will appreciate the ability to drag items displayed on a user interface presented on a monitor and to drop items onto folders or containers for such items.

FIG. 9 is a state diagram illustrating the preferred method of selectively recording a data structure 38 (FIG. 1) from an action associated with an internal program module 710 (FIG. 7) or a registered external program module 37b (FIG. 1). Referring now to FIGS. 1, 4, and 7–9, the preferred method 900 begins in state 905 where each of the external program modules 37b is registered upon installing the external program module 37b on the hard disk drive 20 (FIG. 1). By registering with the DTIM program module 37a, the registered external program modules 37b can report actions to the journal module 705 via a temporary file 825 in memory. Each of the internal program modules 710 is automatically registered in the JournalMePlease registry listing when the registry is created.

In state 910, the DTIM program module 37a is launched. When the DTIM program module 37b has been started, the user selects which actions are sufficiently important to record a data structure 38 containing information related to the important action in state 915. The important actions are selected from the Journal Selection page (FIG. 3).

After selecting the important actions or if important actions have already been selected, the journal module 705 reads the temporary file 825 in state 920. This is initially performed to determine if an external action related to the registered external program modules 37b has occurred. External program modules 37b can report related external actions to the temporary file 825 in memory, even when the journal module 705 is not concurrently running. Thus, the status of the journal module 705 and the DTIM program module 37a are advantageously transparent to any registered external program module 37b. In state 920, if an action from any of the registered external program modules 37b has been initially reported to the temporary file 825, the initially reported action is filtered by the filter module 805 in state 925 to determine if the action is one of the important actions selected in state 915. If so, then in state 930, the information or properties associated with the action is separated by the property separator module 810 corresponding to predetermined data fields 410a–i. The separated information is then stored in a data structure 38 in state 935 before returning to an idle state 940.

However, if an action has not been reported to the temporary file 825 in state 920 or an action is not one of the important actions in state 925, the preferred method 900 proceeds to the idle state 940. While in the idle state 940, the temporary file 825 is read in state 920 to determine if either an action by an internal program module 710 or a registered external program module 37b has occurred. If so, the action is processed, as described above, by filtering in state 925. If the action is an important action, then information associated with the action is separated in state 930. The separated information is then stored in data fields 410a–i of a data structure 38 in state 935 before returning to the idle state 940.

Additionally, while in the idle state 940, if the user chooses to prompt the DTIM program module 37a to record a data structure 38 using the inspector dialog 405, the user inserts appropriate information into the data fields 410a–i in state 945. The inserted information is then stored in a data structure 38 in state 935 before returning to the idle state 940. However, if the user chooses to record a data structure 38 by coercion (dragging and dropping of a graphical representation of an action onto an icon representing the central container 39), then the data fields 410a–i are pre-populated with information related to the selected action in state 950. The information contained in the data fields 410a–i is then stored as a data structure 38 in state 935 before returning to the idle state 940.

Using the preferred method 900 as described, a data structure 38 can be recorded and kept in the central container 39 along with other previously recorded data structures. This central container 39 acts as a centralized depository for the data structure 38 and previously recorded data structures in the preferred embodiment.

A representation of the data structure 38 may be viewed in a tabular format (FIG. 5) or in a timeline format (FIG. 6). As previously discussed, one advantage of the timeline format is that it allows the user to view a representation of a data structure 38 according to when the data structure 38 has been recorded and in relation to when other previously recorded data structures have been recorded. Furthermore, a user can view representations of data structures in selected groups, which may be advantageous if the user wants to find a data structure in relation to an identified data structure.

FIG. 10 is flow diagram illustrating the preferred method 1000 of viewing representations of data structures along a horizontal timeline in selectable groupings. Referring now to FIGS. 1, 4, 6, and 10, the recorded data structures are read from a central container 39 at step 1005. At step 1010, representations of the data structures 615a–b are displayed on the user interface of the computer 10 in a default timeline format. In the preferred embodiment, this default timeline format includes using the current day as a reference date, using the current week as a band of time to view, and grouping by type of action.

At step 1015, a reference date or time period for viewing along the timeline is selected. In the preferred embodiment, the user may select this time period by choosing a day, week, or month from a miniature calendar dialog 630 displayed on the user interface presented on the computer monitor 31. Alternatively, the user may select this time period by typing a specific date in a dialog entry.

At step 1020, the grouping of representations of data structures is selected. As illustrated in FIG. 6, the timeline view allows the user to group representations of data structures 615a–b. In the preferred embodiment, representations of data structures 615a–b can be grouped according to the type of action related to the data structure 38 (e.g., electronic mail message, document, or appointment), the contact associated with the data structure 38, and subject of the data structure 38. This is illustrated in FIG. 6, where the icons representing data structures 615a–b are grouped according to the type of action related to the data structure 38.

Referring back to FIG. 10, after the grouping parameter is selected from step 1020, representations of data structures 615a–b are displayed, preferably as graphical images with some descriptive text from the Subject data field 410a, within the selected groupings.

As previously discussed in connection with FIG. 6, the user is able to take advantage of the grouping feature. For example, the user may receive an important electronic mail message concerning the deadline for a multimedia project upon which the user is working. The user knows she received the electronic mail message last week, but cannot remember when or who it was from. However, the user does know that she received the electronic mail message while she was working on a document for the same multimedia project. By chronologically displaying icons 615a–b representing data structures related to these actions along a timeline and grouped according to the type of action, the user can easily view the data structure icon 615b for the multimedia project document. Using this point in time as a reference, the user can find a data structure icon 615a related to the important electronic mail message displayed in close proximity to the meeting request data structure icon 615b.

Referring back to FIG. 10, the user is able to navigate through the timeline by zooming in or out about the selected reference date. If the user desires to zoom in or out in step 1030, then the horizontal time scale is appropriately reduced or increased in step 1032. Thus, the user can locate representations of recorded data structures 615a–b related to important actions by first viewing broad bands of time and then by refining the view into narrower bands of time.

At step 1035, grouping of the data structure representations 615a–b may be changed. If desired, a new grouping parameter for the data structure representations 615a–b can be selected at step 1020 before being displayed again at step 1025.

At step 1040, the selected reference date may be changed to further navigate the timeline of data structure representations 615a–b. If so, then a new reference date is selected at step 1015.

When the user is finished viewing the timeline of data structure representations 615a–b, the user can exit the timeline view in step 1045.

From the foregoing description, it will be appreciated that the present invention provides a system for selectively recording a data structure 38 associated with an action by either an internal program module 710 or an external program module 37b. In the preferred embodiment, a group of important actions is selected corresponding to both internal program modules 710 and registered external program modules 37b. Next, the system determines if an action associated with an internal program module 710 or a registered external program module 37b has occurred. If so, the system determines if the action is one of the important actions. If so, then information associated with the important action is separated or copied into data fields 410a–i of a data structure 38 and stored in computer memory, such as RAM 15, the floppy disk 23, or the hard disk drive 20. The data structure 38 is maintained in computer memory within a central container 39, along with previously recorded data structures. The data structure 38 can be automatically deleted after a predetermined threshold of time.

A representation of the data structure 615a can be viewed along with representations of previously recorded data structures 615b along a chronological timeline in related groups 625. The groups 625 are selected based upon a particular data field of the data structure 38.

The foregoing system may conveniently be implemented in a program module that is based upon the flow charts in FIGS. 9 and 10. No particular programming language has been required for carrying out the various procedures described above because it is considered that the operations, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes.

The present invention has been described in relation to particular embodiments which are intended in all respects to be illustrative rather than restrictive. The particular embodiment described is one of recording a data structure 38, known as a journal entry, and viewing a representation of the data structure 38 in a DTIM program module 37a. However, those skilled in the art will understand that the principles of the present invention apply to any tasks or processes that require selectively recording a data structure 38 related to an important action and recording a data structure 38 related to an action by either an internal program module 710 or an external program module 37b.

Alternative embodiments will become apparent to those skilled in the art to which the present invention pertains without departing from its spirit and scope. Accordingly, the scope of the present invention is defined by the appended claims rather than the foregoing description.

What is claimed is:

1. A desktop information manager having a computer-implemented process for selectively recording a data structure corresponding to an important action associated with one of a plurality of predetermined program modules, the predetermined program modules including an internal program module and a registered external program module comprising the steps of:

registering an external program module as said registered external program module;

receiving a specification for said important action;

receiving an action associated with one of the predetermined program modules;

determining if said action associated with one of the predetermined program modules is said important action; and if said action associated with one of the predetermined program modules is said important action, then recording information related to said action into said data structure.

2. The computer-implemented process of claim 1, wherein said plurality of predetermined program modules comprises at least one internal program module.

3. The computer-implemented process of claim 1, wherein said recording step includes separating said information associated with said important action into a plurality of data fields within said data structure.

4. The computer-implemented process of claim 1, further comprising the step of viewing a representations of said data structure along with representations of at least one previously recorded data structure in chronological order and in related groups based upon a particular one of plurality of data fields within said data structure.

5. The computer-implemented process of claim 4, wherein said representation of said data structure comprises a graphical image that identifies a type of action associated with said data structure.

6. The computer-implemented process of claim 4, wherein said representation of said data structure comprises information associated with one of said plurality of data fields.

7. The computer-implemented process of claim 1, further comprising the step of deleting said data structure after a predetermined threshold of time.

8. A desktop information manager having a computer-implemented process for selectively recording a data structure associated with an important action by one of a plurality of predetermined program modules, comprising the steps of:

receiving a specification for said important action, said specification specifying an important event and an important contact;

receiving an action associated with one of said predetermined program modules, said action having an event and a contact associated with said action;

filtering said action associated with one of said predetermined program modules based on said event and said contact associated with said action by determining whether said event is said important event and said contact is said important contact; and if said event is said important event and said contact is said important contact, then recording information related to said action into said data structure in memory.

9. The computer-implemented process of claim 8, wherein said recording step includes separating said information associated with said action into a plurality of data fields within said data structure.

10. The computer-implemented process of claim 8, further comprising the step of viewing a representation of said data structure along with representations of at least one previously recorded data structure in chronological order and in related groups based upon a particular one of a plurality of data fields within said data structure.

11. The computer-implemented process of claim 10, wherein said representation of said data structure comprises a graphical image that identifies a type of action associated with said data structure.

12. The computer-implemented process of claim 10, wherein said representation of said data structure comprises information associated with one of said plurality of data fields.

13. The computer-implemented process of claim 8, further comprising the step of deleting said data structure from memory after a predetermined threshold of time.

14. A desktop information manager having computer-implemented process for selectively recording a data structure associated with an important action by one of a plurality of predetermined program modules, said program modules comprising at least one internal program module and at least one registered external program module, comprising the steps of:

registering an external program module as a registered external program module when said external program module is installed;

receiving a specification for an important action associated with one of said predetermined program modules, said important action defined by an important event;

determining if an action associated with one of said predetermined program modules has occurred;

if said action associated with one of said predetermined program modules has occurred, then determining if said action is said important action by determining whether an event associated with said action is said important event;

separating information associated with said important action;

storing said separated information associated with said important action into a plurality of data fields of said data structure in memory; and viewing a representation of said data structure along with representations of at least one previously recorded data structure in chronological order in related groups based upon a particular data field from said plurality of data fields.

15. The computer-implemented process of claim 14, wherein said representation of said data structure comprises a graphical image that identifies a type of action associated with said data structure.

16. The computer-implemented process of claim 14 further comprising the step of picking a reference date for viewing said representation of said data structure and said representations of said at least one previously recorded data structure.

17. The computer-implemented process of claim 14 further comprising the step of deleting said data structure from memory after a predetermined threshold of time.

18. The computer-implemented process of claim 14, wherein said data structure and said at least one previously recorded data structure are maintained in a central container stored in memory.

19. A computer system having a desktop information manager for selectively recording a data structure associated with an important action by one of a plurality of predetermined program modules, comprising:

a central processing unit (CPU);

an input device coupled to said CPU;

a pixel-based display device coupled to said CPU;

a memory storage device coupled to said CPU for maintaining said data structure; and said CPU being operative to:
  receive a definition of an important action,
  determine if an action has occurred,
  if said action has occurred, then to filter said action to determine if said action is said important action,
  if said action is said important action, then to separate information associated with said important action,
  store said separated information into a plurality of data fields of said data structure,
  maintain said data structure within a central container in said memory storage device, and
  display a representation of said data structure and representations of at least one previously recorded data structure on said pixel-based memory display device along a chronological timeline in related groups based upon one of a plurality of data fields associated with said data structure.

20. The computer system of claim 19, wherein said CPU is further operative to read a file stored in said memory storage device in order to determine if said action has occurred.

21. The computer system of claim 19, wherein said plurality of predetermined program modules comprises at least one internal program module and at least one external program module.

22. The computer system of claim 21, wherein said CPU is further operative to indicate an occurrence of said action by writing said information associated with said action to said file using a first interprocess communication if said action is associated with said at least one internal program module.

23. The computer system of claim 21, wherein said CPU is further operative to indicate an occurrence of said action by writing said information associated with said action to said file using a second interprocess communication if said action is associated with said at least one external program module.

24. The computer system of claim 19, wherein said CPU is further operative to delete said data structure from said memory storage device after a predetermined threshold of time.

25. A computer-readable medium on which is stored a desktop information manager having a computer program for selectively recording a data structure associated with an important action by one of a plurality of predetermined program modules, said computer program comprising instructions, which when executed by a computer, perform the steps of:

receiving a specification for an important action, said specification specifying an event and a contact associated with said important action;

receiving an action from one of the predetermined program modules;

determining if said action associated with one of said plurality of predetermined program modules is said important action by determining whether said action is associated with said event and said contact;

if said action associated with one of said plurality of predetermined program modules is said important action, then recording said data structure in memory, said data structure having information associated with said action in a plurality of data fields; and viewing a representation of said data structure along with representations of at least one previously selectively recorded data structure in chronological order in related groups based upon a particular data field from said plurality of data fields.

26. The computer-readable medium of claim 25, wherein said plurality of predetermined program modules is comprised of at least one internal program module and at least one external program module.

27. The computer-readable medium of claim 25, wherein said recording step comprises separating said information associated with said action into said plurality of data fields of said data structure and storing said data structure in memory.

28. The computer-readable medium of claim 25, wherein said representation of said data structure comprises a graphical image that identifies a type of action associated with said data structure.

29. The computer-readable medium of claim 27, wherein said representation of said data structure comprises said separated information from one of said plurality of data fields.

30. A desktop information manager having a method for selectively recording an important action associated with a program module, comprising the steps of:

registering an external program module as a registered external program module;

receiving a specification for a first important action associated with an internal program module;

receiving a specification for a second important action associated with said registered external program module;

receiving an action associated with said internal program module;

determining if said action associated with said internal program module is said first important action;

if said action associated with said internal program module is said first important action, then recording information related to said action into a first data structure;

receiving an action associated with said registered external program module;

determining if said action associated with said registered external program module is said second important action; and if said action associated with said registered external program module is said second important action, then recording information related to said action into a second data structure.

31. The method of claim 30, wherein the first important action is specified by specifying a first event, and wherein the step of determining if said action associated with said internal program module is said first important action comprises the steps of:

determining whether said action associated with said internal program module corresponds to said first event.

32. The method of claim 30, wherein the second important action is specified by specifying a second event, and wherein the step of determining if said action associated with said registered external program module is said second important action comprises the steps of:

determining whether said action associated with said registered external program module corresponds to said second event.

* * * * *